Figure 1:
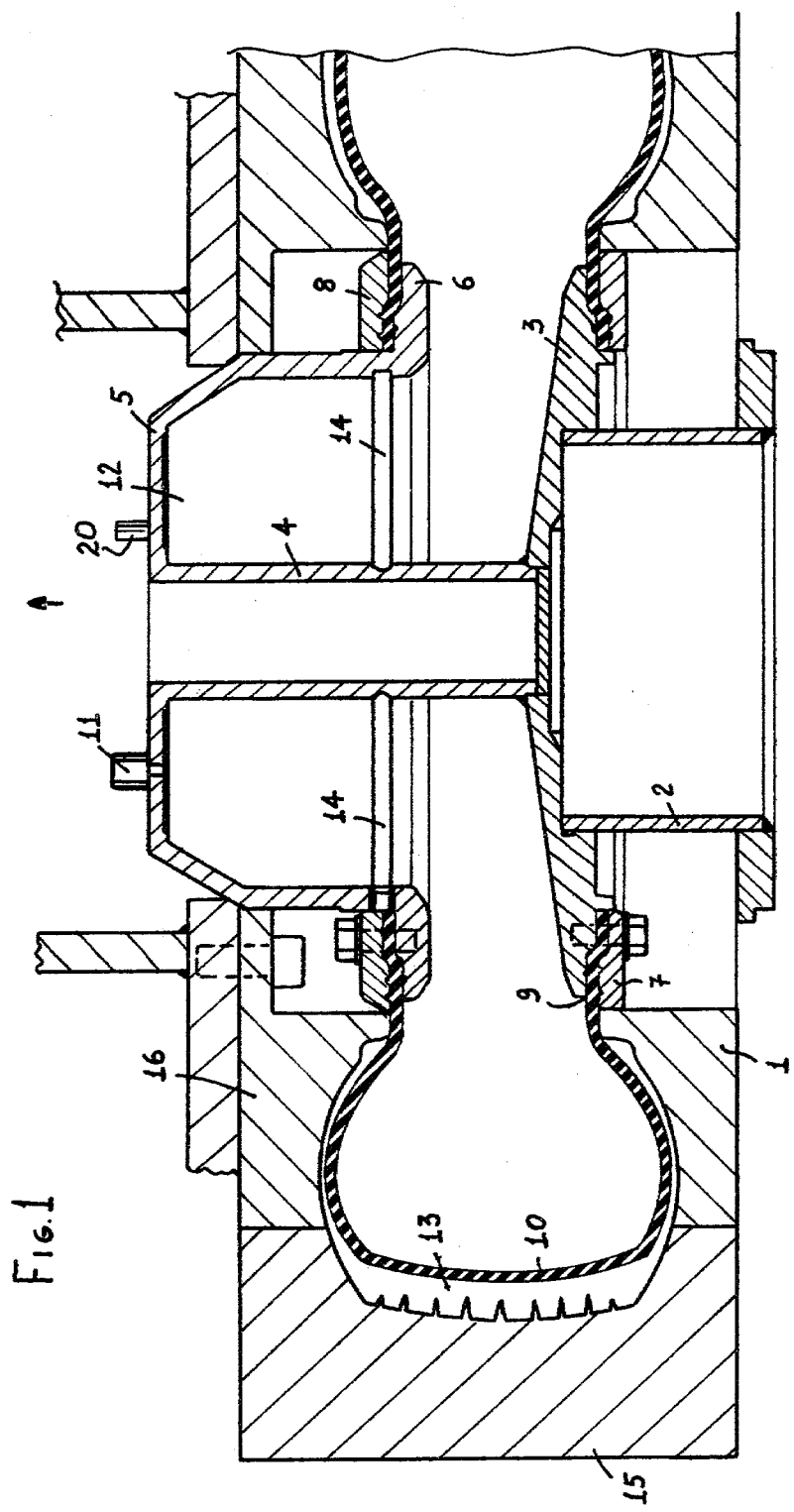

United States Patent [19]

Napolitano

[11] 4,203,713
[45] May 20, 1980

[54] TIRE RETREADING AUTOMATIC PRESS

[76] Inventor: Vincenzo Napolitano, Via delle Rose, 6, 20065 Inzago (Milano), Italy

[21] Appl. No.: 3,521

[22] Filed: Jan. 15, 1979

[30] Foreign Application Priority Data

Feb. 3, 1978 [IT] Italy .................. 19960 A/78

[51] Int. Cl.² .............................................. B29H 5/04
[52] U.S. Cl. ............................... 425/23; 425/33; 425/43
[58] Field of Search ............... 425/17, 18, 19, 20, 425/21, 22, 23, 24, 25, 31, 32, 33, 34, 35, 36, 37, 39, 40, 43

[56] References Cited

U.S. PATENT DOCUMENTS

| | | | |
|---|---|---|---|
| 2,337,857 | 12/1943 | Soderquist | 425/33 |
| 2,854,693 | 10/1958 | Robbins | 425/23 |
| 3,337,917 | 8/1967 | Ballé | 425/43 |

FOREIGN PATENT DOCUMENTS 441162  5/1975  U.S.S.R. ............................ 425/33

Primary Examiner—J. Howard Flint, Jr.
Attorney, Agent, or Firm—Bucknam and Archer

[57] ABSTRACT

An automatic press for tire retreading is described which comprises a basic fixed stamp or mold, a plurality of movable radial sectors cooperating with the stamp or mold, and a vertical axis frame jointed to the fixed stamp. The frame is substantially shaped as a double bell and has a suitable radial opening. Along the edges of the frame, the perimetrical borders of a band which is comparable to an opened air tube, are fixed by means of annular elements; the air tube is blown-up through the air space defined by the bell frame by means of a valve. A suction valve which allows the air to be exhausted from the chamber without the necessity of providing for a pump is also provided.

4 Claims, 4 Drawing Figures

TIRE RETREADING AUTOMATIC PRESS

This invention relates to an automatic press for tire retreading, which is provided with a peculiar open vulcanization chamber of the flexible type.

As it is known, the use of tire retreading has actually a wide development, and it substantially consists of the replacement of the old worn tire tread with a new one.

The application of the new tire tread on a properly treated tire frame is carried out by means of a vulcanization process which is carried out by means of suitable presses.

The latter are essentially constituted by a heated die or mold in the interior of which the tire frame is housed, said tire frame, by interposing special adhesives, holding the new tire tread.

Obviously, during the vulcanization process, it is necesary to apply a proper pressure in the interior of the tire in order to make it sufficiently adherent to the stamp or mold by remaining well stretched.

Such an operation is actually carried out by means of a suitable vulcanization chember which may be of toroidal shape, therefore comparable to a conventional air tube, or which may be shaped as a hollow cylinder.

The use of the toroidal chambers, however, requires use of substantial labour in order to introduce, at first, and, then, to extract the toroidal chamber from the interior of the tire. Furthermore, in order to execute this extraction, it is necessary to wait for complete cooling of the tire; it is therefore necessary to have available a plurality of toroidal vulcanization chambers.

On the other hand, the vulcanization chamber shaped as a hollow cylinder, or "hollow tube", requires, because of its considerable length, a greater stroke of the movable portion of the press.

The above mentioned practical and functional disadvantages, are eliminated by means of the use of the press for tire retreading which is the object of this invention.

As a matter of fact, this press is so formed as to include an open but very flexible vulcanization chamber which may be removed from the interior of the tire by means of a simple decompression action.

More particularly, the present automatic press for tire retreading is constituted by a fixed basic stamp or mold formed of a plurality of radial sectors, which are suitable to form the mold portion enveloping the new tire tread which is applied to the tire frame.

To the fixed mold a vertical frame is joined, substantially formed as a double bell and provided with a radial opening the height of which is in relationship to the distance among the beads of the tire to be retreaded.

The external borders of a band are fixed to the ends of the frame by means of many annular elements, this band being comparable to an open air tube preferably made of butyl rubber. The air tube is inflated through the air space defined by the bell frame by means of a valve which is provided at the top of the bell itself.

Along the compressed air supply circuit, furthermore, a suction valve is provided which allows the air to be exhausted from the elastic chamber, without the necessity of using a pump.

In particular, into the air space four or more small bars are located on the same plane and in the radial direction, which are suitable to avoid the elastic chamber, if suction is applied in the air space itself because of the depression, to plug the air suction duct.

It should also be stressed that the double bell frame might also be applied on the fixed portion of a pre-existing press, allowing it to be used without "hollow tube".

Figure 2:
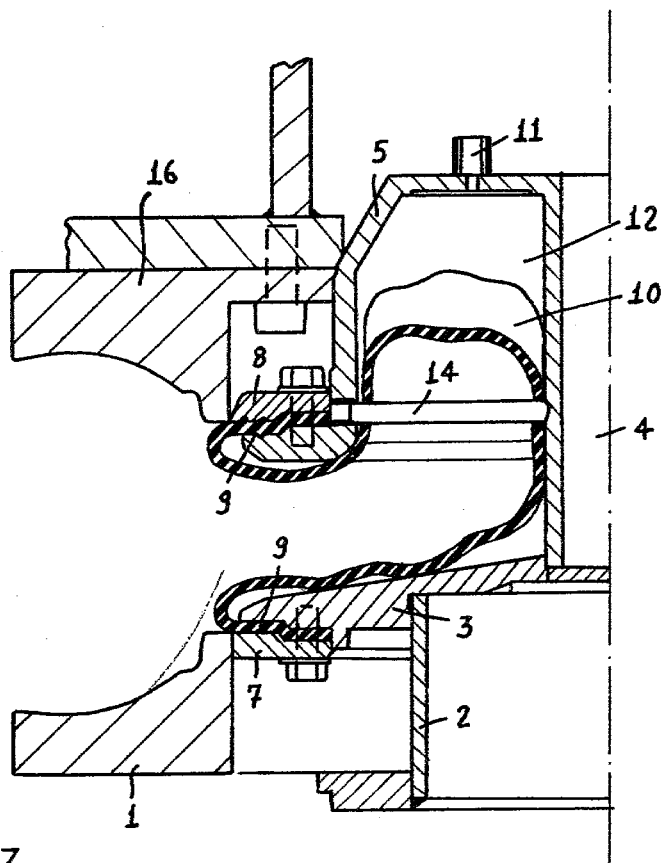
Figure 3:
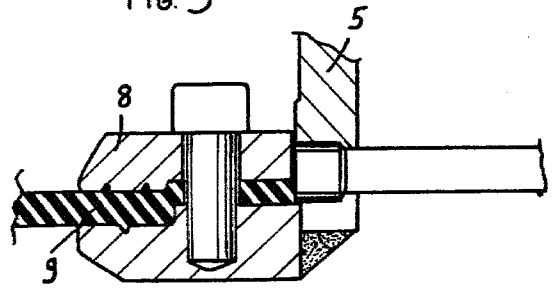
Figure 4:
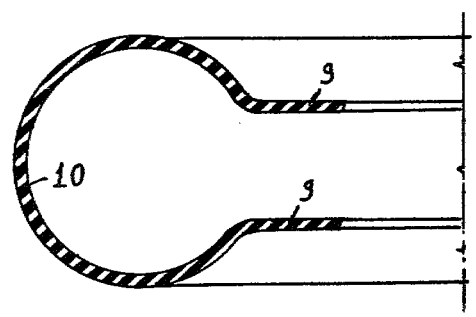

The above and further characteristics and features of the automatic press for tire retreading which is the object of this invention will be better understood with reference to the figures of the attached drawings, where:

in FIG. 1 it is shown a schematic and partial vertical section of the press, when the vulcanization chamber is inflated;

in FIG. 2 it is shown a portion of the press of FIG. 1 with the vulcanization chamber sucked out from the tire;

in FIG. 3 it is shown the way for coupling the vulcanization chamber with the edges of the double bell frame;

in FIG. 4 is it shown a section of the same vulcanization chamber.

Referring to the numerals on these drawings, the present automatic press for tire retreading is constituted by a basic stamp or mold 1 joined to the fixed part 2.

On the fixed part, a disc member 3 is applied, which axially holds, through a tubular support 4, a bell frame 5 provided with a projecting edge 6.

To this latter, and to the edge of the above-mentioned disc member 3 are locked the perimetrical portions 9 of a suitably shaped vulcanization chamber 10, by means of circular bodies 7 and 8.

In particular, the vulcanization chamber is realized by means of an open circular band (see FIG. 4) which is preferably made of butyl rubber.

This vulcanization chamber may be inflated by means of a suitable air supply circuit (not shown in the drawings) through one or more check or nonreturn valves 11 and the air space 12 which is delimited by the bell frame 5.

The deflation of the same vulcanization chamber, in particular, is carried out by using the action of a suction valve 20 which is installed along the compressed air circuit in order to produce a suitable depression, in the interior of the same chamber, without the use of a specific pump.

In practice, suction is applied to the above chamber during the depression step, into the air space 12, releasing in this manner the retreaded tire 13.

In order to prevent the side wall of the chamber 10 plugging the suction valve which is installed at the top of the bell frame 5, between the same bell frame and the axial support thereof (4), four or more radial small bars 14 are furthermore located.

By this expedient the walls of the chamber 10, because of the vacuum applied upstream, assume a sinusoidal course without touching the suction valve itself.

The mold for the tire is completed by a plurality of radially movable perimetrical sectors 15, and by an upper circular portion 16 which may be moved in the vertical direction.

It should also be stressed that the disc member 3 holding the bell frame 5 might be easily applied on pre-existing vulcanization chambers, in order to improve their functionality.

For this purpose, the disc member 3 is coupled to the fixed portion 2 of the press by means of suitable screw threads.

What I claim is:

1. An automatic press for tire retreading, which comprises a fixed mold base formed by a plurality of movable radial sectors, a vertical frame substantially shaped as a double bell joined to said fixed mold, said vertical frame having a radial opening; a band fixed along the edges of said frame at the perimetrical borders of said band, said band acting as an open air tube; said air tube being inflated through the air space defined by said bell frame and forming an air chamber, a valve at the top of the same bell frame for inflating said air tube; a suction valve located on said bell frame for exhausting air from said chamber, at least four small bars located in said air chamber in the same plane and along the radial direction.

2. The automatic press according to claim 1, wherein said fixed mold base is joined to the fixed portion of the press, on said fixed portion being applied a disc member axially holding, through a tubular support, said bell frame provided with a projecting edge.

3. The automatic press according to claim 2 wherein connection means are provided for locking to said projecting edge and to the edge of the disc member perimetrical portions of said band which forms a vulcanization chember.

4. The automatic press according to claim 1 wherein the mold is completed by an annular upper portion which may be moved in the vertical direction which engages with said plurality of movable radial sectors.

* * * * *